(12) United States Patent
Katrak

(10) Patent No.: US 10,439,496 B2
(45) Date of Patent: Oct. 8, 2019

(54) CONTROL SYSTEM FOR TRANSITIONING A DC-DC VOLTAGE CONVERTER FROM A BUCK OPERATIONAL MODE TO A SAFE OPERATIONAL MODE

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/682,143

(22) Filed: Aug. 21, 2017

(65) Prior Publication Data
US 2018/0062520 A1   Mar. 1, 2018

Related U.S. Application Data

(60) Provisional application No. 62/381,125, filed on Aug. 30, 2016.

(51) Int. Cl.
*G05F 1/62* (2006.01)
*H02M 1/32* (2007.01)
(Continued)

(52) U.S. Cl.
CPC ............ *H02M 3/1582* (2013.01); *G05F 1/46* (2013.01); *G05F 1/461* (2013.01); *G05F 1/62* (2013.01);
(Continued)

(58) Field of Classification Search
CPC .................................................... H02M 3/158
See application file for complete search history.

(56) References Cited

U.S. PATENT DOCUMENTS 7,923,865 B2   4/2011  Melse
8,587,283 B2   11/2013 Wu
(Continued)

FOREIGN PATENT DOCUMENTS

EP   2006972 A   12/2008
EP   2490124 A3  2/2013
(Continued)

OTHER PUBLICATIONS

U.S. Appl. No. 15/651,005, filed Jul. 17, 2017 entitled Control System for Controlling Operational Modes of a DC-DC Voltage Converter.

*Primary Examiner* — Jue Zhang
*Assistant Examiner* — Trinh Q Dang
(74) *Attorney, Agent, or Firm* — Buckert Patent & Trademark Law Firm PC; John F. Buckert

(57) ABSTRACT

A control system for a DC-DC voltage converter includes a microcontroller having first and second applications. The first application commands the microcontroller to generate a first signal that is received at a first pin on a high side integrated circuit to transition a first plurality of FET switches to an open operational state, and that is received at a first pin on the low side integrated circuit to transition a second plurality of FET switches to the open operational state. The second application commands the microcontroller to generate a second signal that is received at a second pin on the high side integrated circuit to transition the first plurality of FET switches to the open operational state, and that is received at a second pin on the low side integrated circuit to transition the second plurality of FET switches to the open operational state.

7 Claims, 9 Drawing Sheets

(51) Int. Cl.
    *H02M 1/36*      (2007.01)
    *H02M 1/096*     (2006.01)
    *H02M 3/156*     (2006.01)
    *H02M 3/158*     (2006.01)
    *H02M 3/335*     (2006.01)
    *G05F 1/46*      (2006.01)

(52) U.S. Cl.
    CPC ............ *H02M 1/096* (2013.01); *H02M 1/32* (2013.01); *H02M 1/36* (2013.01); *H02M 3/156* (2013.01); *H02M 3/1584* (2013.01); *H02M 3/33584* (2013.01)

(56) References Cited

U.S. PATENT DOCUMENTS

| | | |
|---|---|---|
| 2003/0155814 A1 | 8/2003 | Gronbach |
| 2010/0201337 A1* | 8/2010 | Bradbury ............... G05F 1/46 323/288 |
| 2011/0235527 A1 | 9/2011 | Buse et al. |
| 2014/0092639 A1 | 4/2014 | Shimada et al. |
| 2015/0288169 A1 | 10/2015 | Schinzel et al. |
| 2015/0326120 A1* | 11/2015 | Kelin ................. H02M 3/158 323/282 |

FOREIGN PATENT DOCUMENTS

| | | |
|---|---|---|
| EP | 2566027 | 5/2013 |
| JP | 2004096826 A | 3/2004 |
| KR | 20110124910 A | 11/2011 |

* cited by examiner

CONTROL SYSTEM FOR TRANSITIONING A DC-DC VOLTAGE CONVERTER FROM A BUCK OPERATIONAL MODE TO A SAFE OPERATIONAL MODE

CROSS-REFERENCE TO RELATED APPLICATION

This application claims priority to U.S. Provisional Patent Application No. 62/381,125 filed on Aug. 30, 2016, the entire contents of which are hereby incorporated by reference herein.

BACKGROUND

The inventor herein has recognized a need for an improved control system for transitioning a DC-DC voltage converter from a buck operational mode to a safe operational mode. In particular, the control system utilizes two distinct and independent applications that each command a microcontroller to generate a control signal to transition FET switches within a DC-DC voltage converter control circuit within the DC-DC voltage converter to open operational states. As a result, the inventive control system can more reliably transition the DC-DC voltage converter to the safe operational mode even if one of the two applications is malfunctioning or if one of the control signals is interrupted or not acted upon by the DC-DC voltage converter.

SUMMARY

A control system for transitioning a DC-DC voltage converter from a buck operational mode to a safe operational mode in accordance with an exemplary embodiment is provided. The DC-DC voltage converter has a high voltage bi-directional switch, a pre-charge high voltage bi-directional switch, a low voltage bi-directional switch, a pre-charge low voltage bi-directional switch, a high side integrated circuit, and a low side integrated circuit. The low voltage bi-directional switch is electrically coupled in parallel to the pre-charge low voltage bi-directional switch between and to first and second electrical nodes. The high voltage bi-directional switch is electrically coupled in parallel to the pre-charge high voltage bi-directional switch between and to third and fourth electrical nodes. The high side integrated circuit is electrical coupled between the first electrical node and the fourth electrical node. The low side integrated circuit is electrically coupled between the first electrical node and the fourth electrical node. The high side integrated circuit has a first plurality of FET switches therein. The low side integrated circuit has a second plurality of FET switches therein. Each FET switch of the first plurality of FET switches is electrically coupled to a respective FET switch of the second plurality of FET switches. The control system includes a microcontroller having a first application and a second application. The first application commands the microcontroller to generate a first control signal that is received at a first input pin on the high side integrated circuit to command the high side integrated circuit to transition each of the first plurality of FET switches therein to an open operational state. The first control signal is further received at a first input pin on the low side integrated circuit to command the low side integrated circuit to transition each of the second plurality of FET switches therein to the open operational state. The microcontroller receives a first confirmation signal from at least one of an output pin of the high side integrated circuit and an output pin of the low side integrated circuit. The second application determines that at least one of the first plurality of FET switches and the second plurality of FET switches are transitioned to the open operational state based on the first confirmation signal. The second application commands the microcontroller to generate a second control signal that is received at a second input pin on the high side integrated circuit to command the high side integrated circuit to transition each of the first plurality of FET switches therein to the open operational state. The second control signal is further received at a second input pin on the low side integrated circuit to command the low side integrated circuit to transition each of the second plurality of FET switches therein to the open operational state.

DETAILED DESCRIPTION

Figure 1:
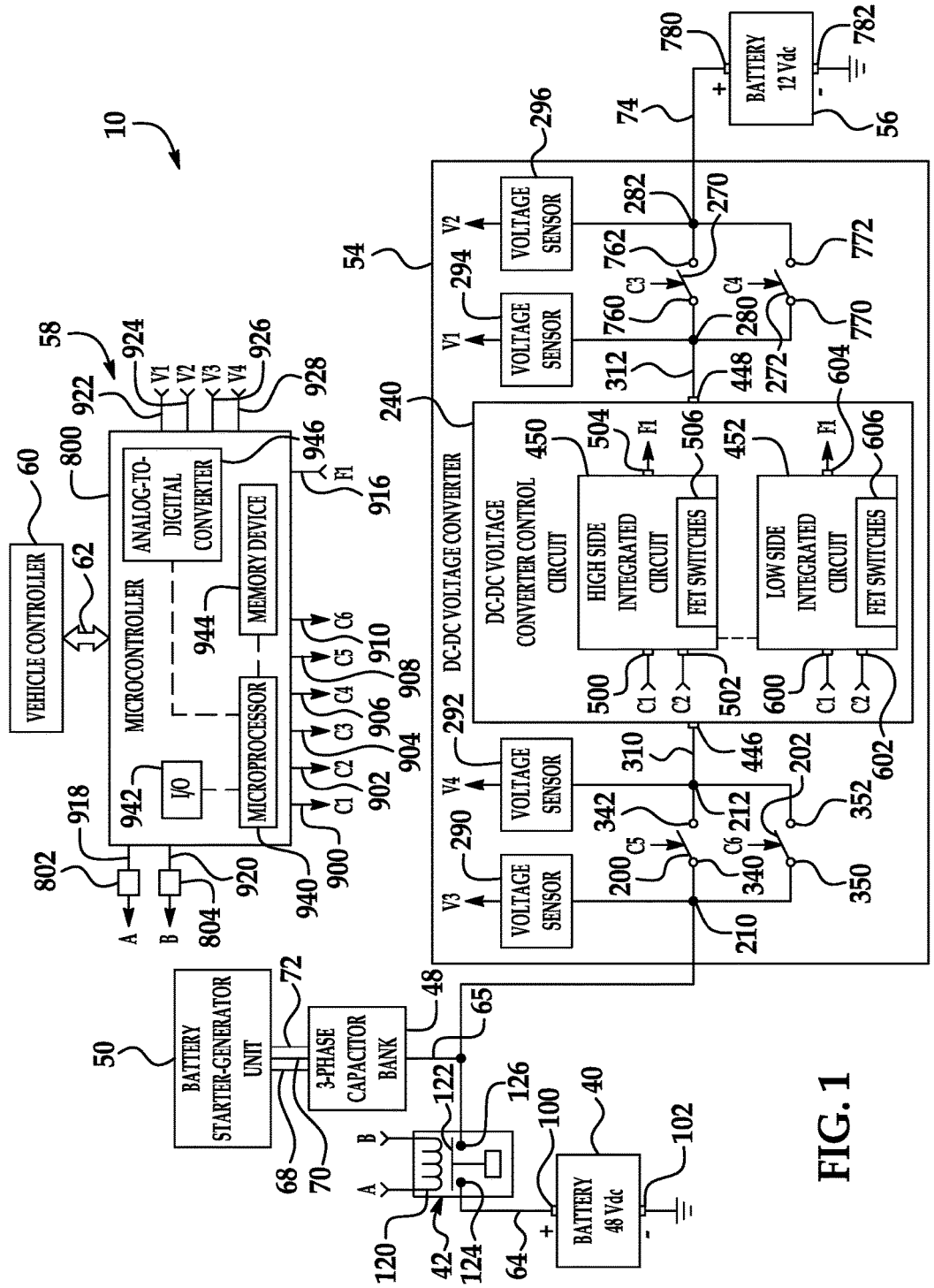
FIG. 1 is a schematic of a vehicle having a control system for a DC-DC voltage converter in accordance with an exemplary embodiment.

Referring to FIG. 1, a vehicle 10 is provided. The vehicle 10 includes a battery 40, a contactor 42, a 3-phase capacitor bank 48, a battery-starter generator unit 50, a DC-DC voltage converter 54, a battery 56, a control system 58, a vehicle controller 60, a communication bus 62, and electrical lines 64, 65, 66, 68, 70, 72, 74.

An advantage of the control system 58 is that the control system 58 has a microcontroller 800 that can more reliably transition the DC-DC voltage converter 54 from a buck operational mode to a safe operational mode. In particular, the microcontroller 800 utilizes two distinct and independent applications that each command the microcontroller 800 to generate a control signal to transition FET switches 506, 606 within a DC-DC voltage converter control circuit 240 within the DC-DC voltage converter 54 to open operational states. As a result, the inventive control system can more reliably transition the DC-DC voltage converter 54 to the safe operational mode even if one of the two applications is malfunctioning or if one of the control signals is interrupted or not acted upon by the DC-DC voltage converter 54.

For purposes of understanding, a node or an electrical node is a region or a location in an electrical circuit. A signal can be an electrical voltage, an electrical current, or a binary value.

The buck operational mode is an operational mode of the DC-DC voltage converter 54 in which the DC-DC voltage converter 54 applies a voltage to the battery 56. In an exemplary embodiment, when the DC-DC voltage converter 54 has the buck operational mode, the contactor 42 has a closed operational state, the high voltage bi-directional MOSFET switch 200 has a closed operational state, the pre-charge high voltage bi-directional MOSFET switch 202 has a closed operational state, the FET switches 506, 606 are being switched as desired, the low voltage bi-directional MOSFET switch 270 has a closed operational state, and the pre-charge low voltage bi-directional MOSFET switch 272 has a closed operational state.

The safe operational mode is an operational mode of the DC-DC voltage converter 54 in which the DC-DC voltage converter 54 does not apply a voltage to the battery 56 or to the battery 40. In an exemplary embodiment, when the DC-DC voltage converter 54 has the safe operational mode, the contactor 42 has an open operational state, the high voltage bi-directional MOSFET switch 200 has an open operational state, the pre-charge high voltage bi-directional MOSFET switch 202 has an open operational state, the FET switches 506, 606 have the open operational state, the low voltage bi-directional MOSFET switch 270 has an open operational state, and the pre-charge low voltage bi-directional MOSFET switch 272 has an open operational state. Further, in the safe operational mode, the microcontroller 60 confirms that the above-mentioned switches each have an open operational state.

The battery 40 includes a positive terminal 100 and a negative terminal 102. In an exemplary embodiment, the battery 40 generates 48 Vdc between the positive terminal 100 and the negative terminal 102. The positive terminal 100 is electrically coupled to a first electrical node 124 on a first side of the contactor 42. The negative terminal 102 is electrically coupled to an electrical ground.

The contactor 42 has a contactor coil 120, a contact 122, a first electrical node 124 and a second electrical node 126. The first electrical node 124 is electrically coupled to the positive terminal 100 of the battery 40. The second electrical node 126 is electrically coupled to both the 3-phase capacitor bank 48 and the electrical node 210 of the DC-DC voltage converter 54. When the microcontroller 800 generates first and second control signals that are received by the voltage drivers 802, 804, respectively, the contactor coil 120 is energized which transitions the contact 122 to a closed operational state. Alternately, when the microcontroller 800 generates third and fourth control signals that are received by the voltage drivers 802, 804, respectively, the contactor coil 120 is de-energized which transitions the contact 122 to an open operational state. In an exemplary embodiment, the third and fourth control signals can each be a ground voltage level.

The 3-phase capacitor bank 48 is utilized to store and release electrical energy from the battery starter-generator unit 50, the battery 40, and the DC-DC voltage converter 54. The 3-phase capacitor bank 48 is electrically coupled to the electrical node 126 of the contactor 126 and the electrical node 210 of the DC-DC voltage converter 54 utilizing the electrical line 65. The 3-phase capacitor bank 48 is further electrically coupled to the battery-starter generator 50 utilizing the electrical lines 68, 70, 72.

The battery-starter generator unit 50 is provided to generate an AC voltage that is received by the 3-phase capacitor bank 48 via the electrical lines 68, 70, 72.

The DC-DC voltage converter 54 includes a high-voltage bi-directional switch 200, a pre-charge high-voltage bi-directional switch 202, electrical nodes 210, 212, a DC-DC voltage converter control circuit 240, a low voltage bi-directional switch 270, a pre-charge low voltage bi-directional switch 272, electrical nodes 280, 282, voltage sensors 290, 292, 294, 296, and electrical lines 300, 312.

Figure 2:
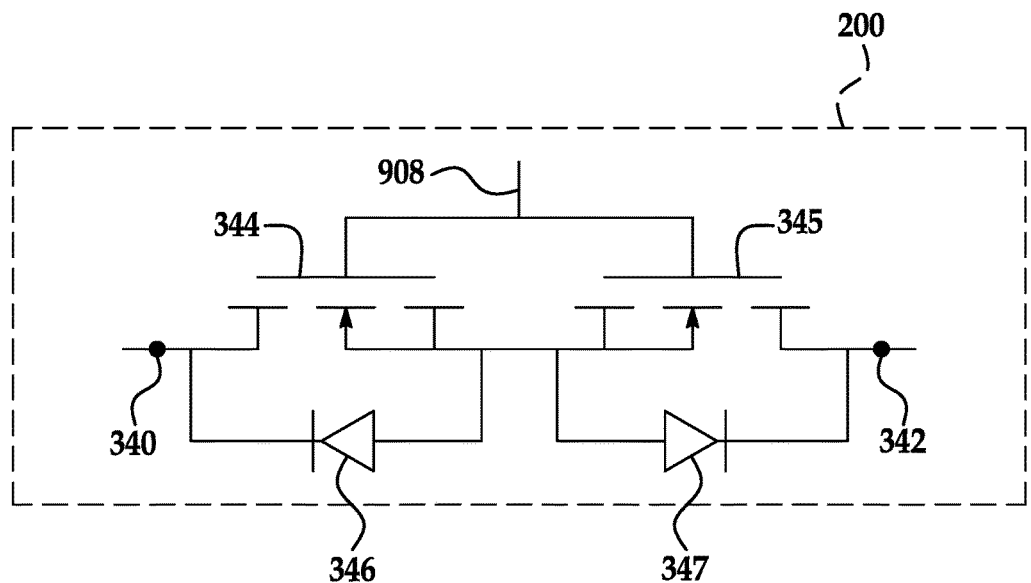
FIG. 2 is a schematic of a bi-directional switch utilized in the DC-DC voltage converter.

Referring to FIGS. 1 and 2, in an exemplary embodiment, the high voltage bi-directional switch 200 includes a node 340, a node 342, MOSFET switches 344, 345, and diodes 346, 347. Of course, in an alternative embodiment, the high voltage bi-directional switch 200 could be replaced with another type of bi-directional switch having desired voltage and current capabilities. The high voltage bi-directional switch 200 is electrically coupled in parallel to the pre-charge high voltage bi-directional switch 202 between and to electrical nodes 210, 212. The node 340 is electrically coupled to the electrical node 210, and the node 342 is electrically coupled to the electrical node 212. When the microcontroller 800 generates a control signal that is received by the high voltage bi-directional switch 200 (or that is received by a controller or a microprocessor within the DC-DC voltage converter 54 that is operably coupled to the switch 200) via the electrical line 908, the microcontroller 800 induces the switch 200 to transition to a closed operational state. When the microcontroller 800 generates another control signal (e.g., ground voltage level control signal) on the electrical line 908, the microcontroller 800 induces the switch 200 to transition to an open operational state.

The pre-charge high voltage bi-directional switch 202 has a node 350 that is electrically coupled to the electrical node 210, and a node 352 that is electrically coupled to the electrical node 212. When the microcontroller 800 generates a control signal that is received by the pre-charge high voltage bi-directional switch 202 (or that is received by a controller or a microprocessor within the DC-DC voltage converter 54 that is operably coupled to the switch 202) via the electrical line 910, the microcontroller 800 induces the switch 202 to transition to a closed operational state. When the microcontroller 800 generates another control signal (e.g., ground voltage level control signal) on the electrical line 910, the microcontroller 800 induces the switch 202 to transition to an open operational state. In an exemplary embodiment, the pre-charge high voltage bi-directional switch 202 is a bi-directional MOSFET switch.

The DC-DC voltage converter control circuit 240 has a terminal 446, a terminal 448, a high side integrated circuit 450, and a low side integrated circuit 452. The DC-DC voltage converter control circuit 240 can convert a DC voltage received at the terminal 446 to another DC voltage that is output at the terminal 448. Alternately, the DC-DC voltage converter control circuit 240 can convert a DC voltage received at the terminal 448 to another DC voltage that is output at the terminal 446.

The high side integrated circuit 450 includes an input pin 500, an input pin 502, an output pin 504, and a plurality of FET switches 506 therein. The input pin 500 is electrically coupled to an input-output device 942 of the microcontroller 800 utilizing an electrical line 900. The input pin 502 is electrically coupled to the input-output device 942 of the microcontroller 800 utilizing the electrical line 902. The output pin 504 is electrically coupled to the input-output device 942 of the microcontroller 800 utilizing an electrical line 916. The plurality of switches 506 are electrically coupled in parallel with one another between the terminals 446, 448. Further, each FET switch of the plurality of FET switches 506 is electrically coupled in series with a respective FET switch in the low side integrated circuit 452. When the high side integrated circuit 450 receives a control signal having a high logic level at the input pin 500, the high side integrated circuit 450 enables operation of the FET switches 506. Alternately, when the high side integrated circuit 450 receives a control signal having a low logic level at the input pin 500, the high side integrated circuit 450 transitions each FET switch of the plurality of FET switches 506 to an open operational state. Further, when the high side integrated circuit 450 receives a control signal having a low logic level at the input pin 502, the high side integrated circuit 450 transitions each FET switch of the plurality of FET switches 506 to an open operational state. Still further, when the high side integrated circuit 450 transitions each FET switch of the plurality of FET switches 506 to an open operational state, the output pin 504 outputs a confirmation signal indicating that each FET switch of the plurality of FET switches 506 has an open operational state, that is received by the input-output device 942 of the microcontroller 800 utilizing the electrical line 916.

The low side integrated circuit 452 includes an input pin 600, an input pin 602, an output pin 604, and a plurality of FET switches 606. The input pin 600 is electrically coupled to an input-output device 942 of the microcontroller 800 utilizing an electrical line 900. The input pin 602 is electrically coupled to the input-output device 942 of the microcontroller 800 utilizing the electrical line 902. The output pin 604 is electrically coupled to the input-output device 942 of the microcontroller 800 utilizing an electrical line 916. The plurality of switches 606 are electrically coupled in parallel with one another between the terminals 446, 448. Further, each FET switch of the plurality of FET switches 606 are electrically coupled in series with a respective FET switch in the high side integrated circuit 450. When the low side integrated circuit 452 receives a control signal having a high logic level at the input pin 600, the low side integrated circuit 452 enables operation of the FET switches 606. Alternately, when the low side integrated circuit 452 receives a control signal having a low logic level at the input pin 600, the low side integrated circuit 452 transitions each FET switch of the plurality of FET switches 606 to an open operational state. Further, when the low side integrated circuit 452 receives a control signal having a low logic level at the input pin 602, the low side integrated circuit 452 transitions each FET switch of the plurality of FET switches 606 to an open operational state. Still further, when the low side integrated circuit 452 transitions each FET switch of the plurality of FET switches 606 to an open operational state, the output pin 604 outputs a confirmation signal indicating that each FET switch of the plurality of FET switches 606 has an open operational state, that is received by the input-output device 942 of the microcontroller 800 utilizing the electrical line 916.

The low voltage bi-directional switch 270 is electrically coupled in parallel to the pre-charge low voltage bi-directional switch 272 between and to electrical nodes 280, 282. The low voltage bi-directional switch 270 has a node 760 that is electrically coupled to the electrical node 280, and a node 762 that is electrically coupled to the electrical node 282. When the microcontroller 800 generates a control signal that is received by the low voltage bi-directional switch 270 (or that is received by a controller or a microprocessor within the DC-DC voltage converter 54 that is operably coupled to the switch 270) via the electrical line 904, the microcontroller 800 induces the switch 270 to transition to a closed operational state. When the microcontroller 800 generates another control signal (e.g., ground voltage level control signal) on the electrical line 904, the microcontroller 800 induces the switch 270 to transition to an open operational state. In an exemplary embodiment, the low voltage bi-directional switch 270 is a bi-directional MOSFET switch.

The pre-charge low voltage bi-directional switch 272 has a node 770 that is electrically coupled to the electrical node 280, and a node 772 that is electrically coupled to the electrical node 282. When the microcontroller 800 generates a control signal that is received by the pre-charge low voltage bi-directional switch 272 (or that is received by a controller or a microprocessor within the DC-DC voltage converter 54 that is operably coupled to the switch 272) via the electrical line 906, the microcontroller 800 induces the switch 272 to transition to a closed operational state. When the microcontroller 800 generates another control signal (e.g., ground voltage level control signal) on the electrical line 906, the microcontroller 800 induces the switch 272 to transition to an open operational state.

The voltage sensor 290 is electrically coupled to the electrical node 210 and to the microcontroller 800. The voltage sensor 290 outputs a voltage measurement signal indicating a voltage at the electrical node 210 that is received by the microcontroller 800 via the electrical line 926.

The voltage sensor 292 is electrically coupled to the electrical node 212 and to the microcontroller 800. The voltage sensor 292 outputs a voltage measurement signal indicating a voltage at the electrical node 212 that is received by the microcontroller 800 via the electrical line 928.

The voltage sensor 294 is electrically coupled to the electrical node 280 and to the microcontroller 800. The voltage sensor 294 outputs a voltage measurement signal indicating a voltage at the electrical node 280 that is received by the microcontroller 800 via the electrical line 922.

The voltage sensor 296 is electrically coupled to the electrical node 282 and to the microcontroller 800. The voltage sensor 296 outputs a voltage measurement signal indicating a voltage at the electrical node 282 that is received by the microcontroller 800 via the electrical line 924.

The battery 56 includes a positive terminal 780 and a negative terminal 782. In an exemplary embodiment, the battery 56 generates 12 Vdc between the positive terminal 780 and the negative terminal 782. The positive terminal 780 is electrically coupled to the electrical node 282 of the DC-DC voltage converter 54. The negative terminal 782 is electrically coupled to an electrical ground, which may be different that the electrical ground that the battery 40 is coupled to.

The control system 58 is utilized to transition the DC-DC voltage converter 54 to a buck operational mode and then to a safe operational mode. The control system 58 includes the microcontroller 800, the voltage drivers 802, 804, the voltage sensors 290, 292, 294, 296 and the electrical lines 900, 902, 904, 906, 908, 910, 916, 918, 920, 922, 924, 926, 928.

Figure 3:
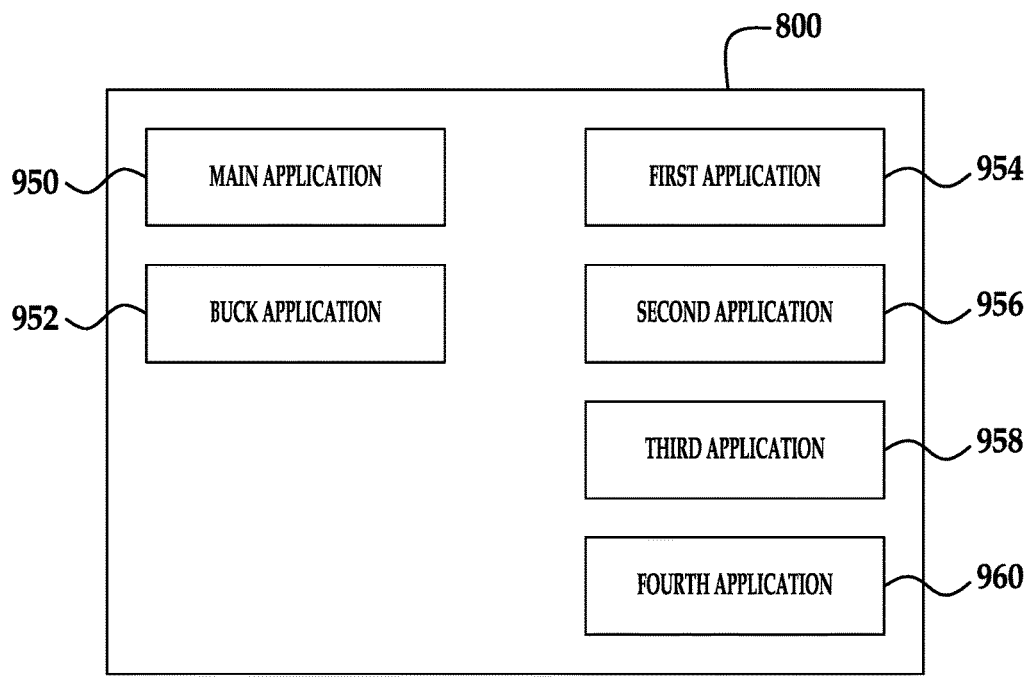
FIG. 3 is a block diagram of a main application, and first, second, third, and fourth applications utilized by a microcontroller in the control system of FIG. 1.

Referring to FIGS. 1 and 3, the microcontroller 800 includes a microprocessor 940, the input-output device 942, the memory device 944, and the analog-to-digital converter 946. The microprocessor 940 further includes a main application 950, a buck application 952, a first application 954, a second application 956, a third application 958, and a fourth application 960 which are executed by the microprocessor 940. The buck application 952, the first application 954, the second application 956, the third application 958, and the fourth application 960 are stored in the memory device 944. The microprocessor 940 is operably coupled to the input-output device 942, the memory device 944, and the analog-to-digital converter 946, the DC-DC voltage converter 54, and the voltage drivers 802, 804.

Referring to FIGS. 1 and 3-12, a flowchart of a method for inducing the DC-DC voltage converter 54 to transition to a buck operational mode, and then to transition the DC-DC voltage converter 54 from the buck operational mode to a safe operational mode is described. The flowchart includes the main application 950, the buck application 952, the first application 954, the second application 956, the third application 958, and the fourth application 960.

Figure 4:
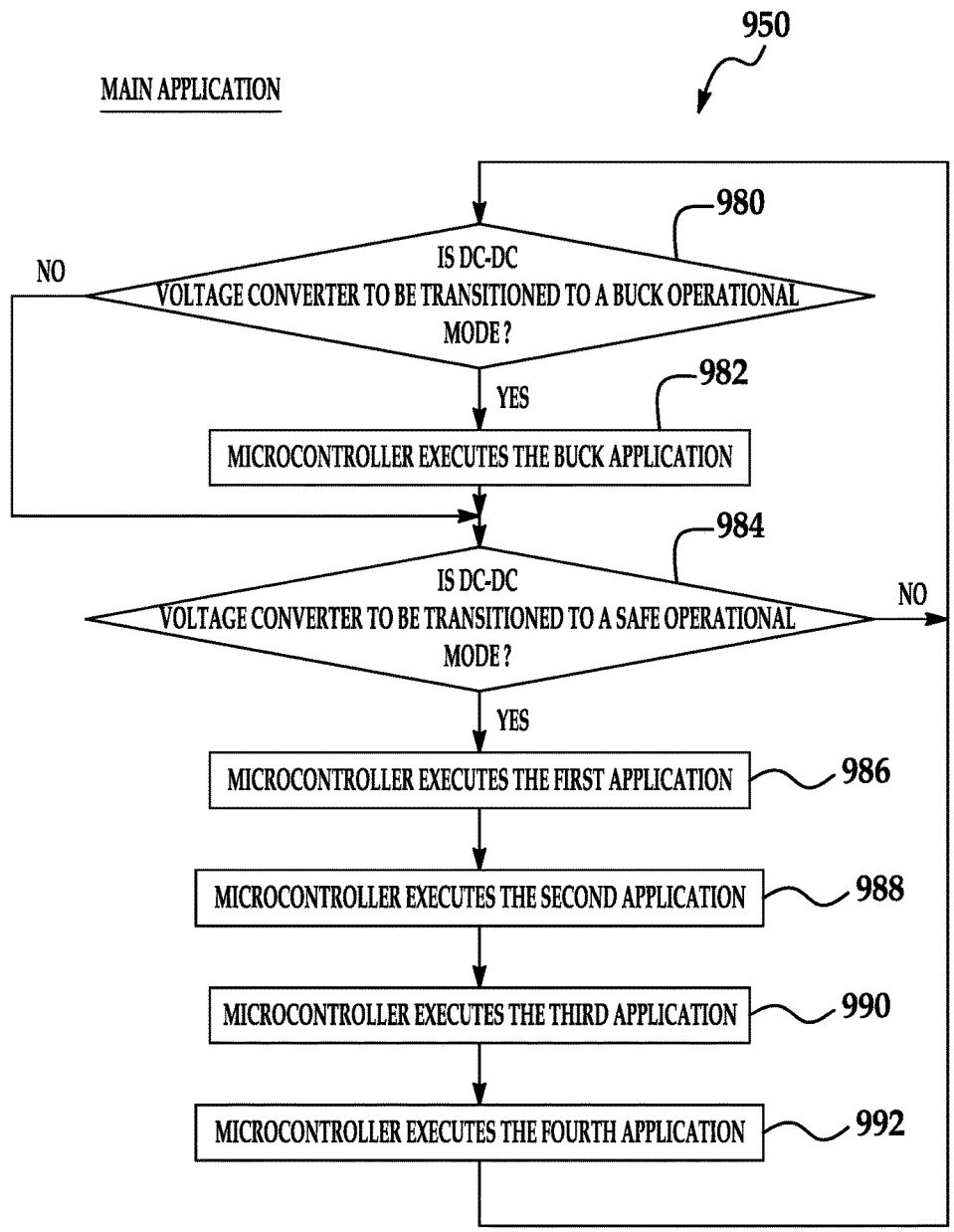
FIGS. 4-12 are a flowchart of a method for transitioning the DC-DC voltage converter from a buck operational mode to a safe operational mode.

Referring to FIG. 4, the main application 950 will now be explained.

At step 980, the microcontroller 800 makes a determination as to whether the DC-DC voltage converter 54 is to be transitioned to a buck operational mode. In an exemplary embodiment, the microcontroller 800 makes the determination as to whether the DC-DC voltage converter 54 is to be transitioned to the buck operational mode, based on a control signal from the vehicle controller 60. If the value of step 980 equals "yes", the method advances to step 982. Otherwise, the method advances to step 984.

At step 982, the microcontroller 800 executes the buck application 952. After step 982, the method advances to step 984.

At step 984, the microcontroller 800 makes a determination as to whether the DC-DC voltage converter 54 is to be transitioned to a safe operational mode. In an exemplary embodiment, the microcontroller 800 makes the determination as to whether the DC-DC voltage converter 54 is to be transitioned to the safe operational mode, based on another control signal from the vehicle controller 60. If the value of step 984 equals "yes", the method advances to step 986. Otherwise, the method returns to step 980.

At step 986, the microcontroller 800 executes the first application 954. After step 986, the method advances to step 988.

At step 988, the microcontroller 800 executes the second application 956. After step 988, the method advances to step 990.

At step 990, the microcontroller 800 executes the third application 958. After step 990, the method advances to step 992.

At step 992, the microcontroller 800 executes the fourth application 960. After step 992, the method returns to step 980.

Figure 5:
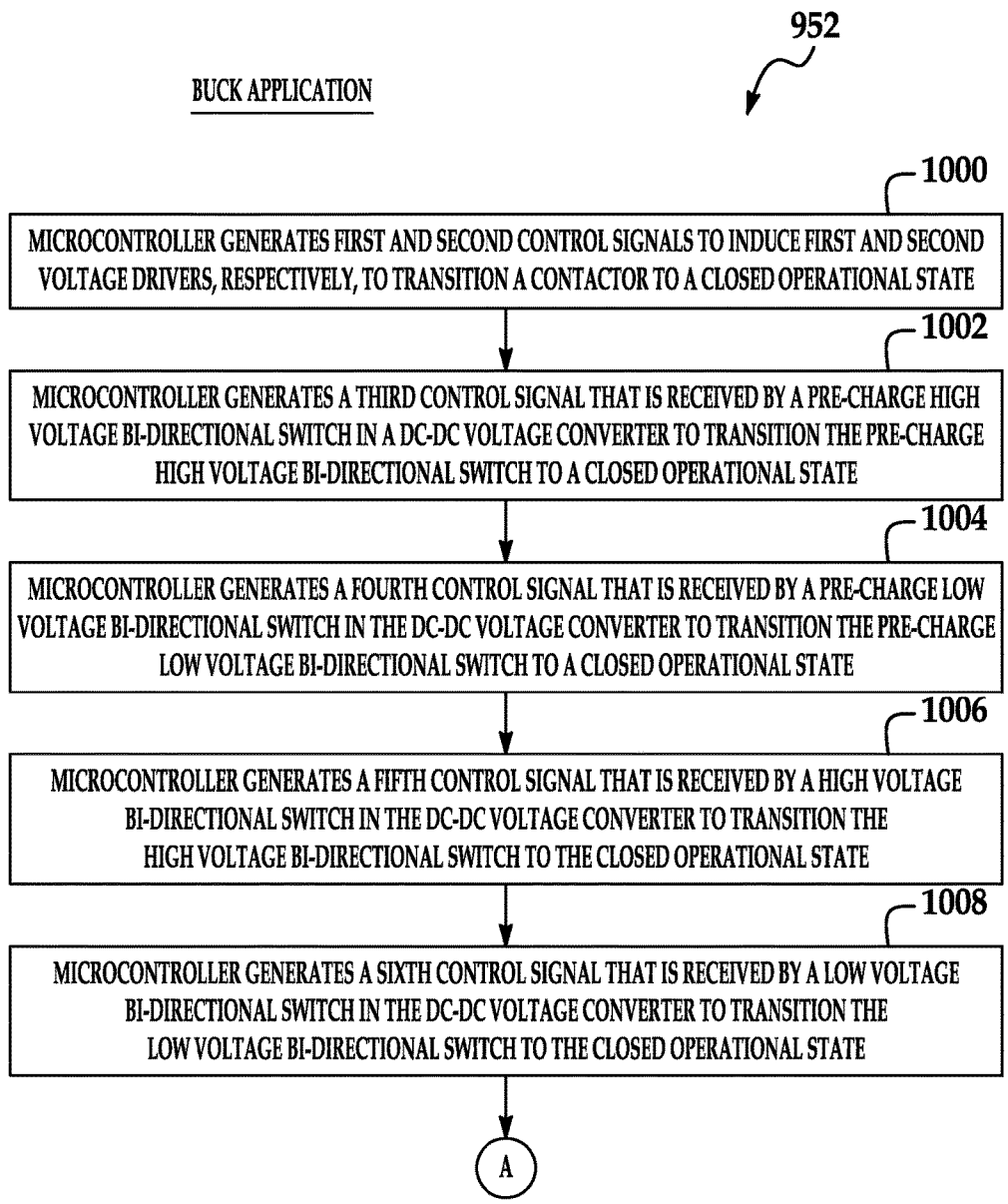
Figure 6:
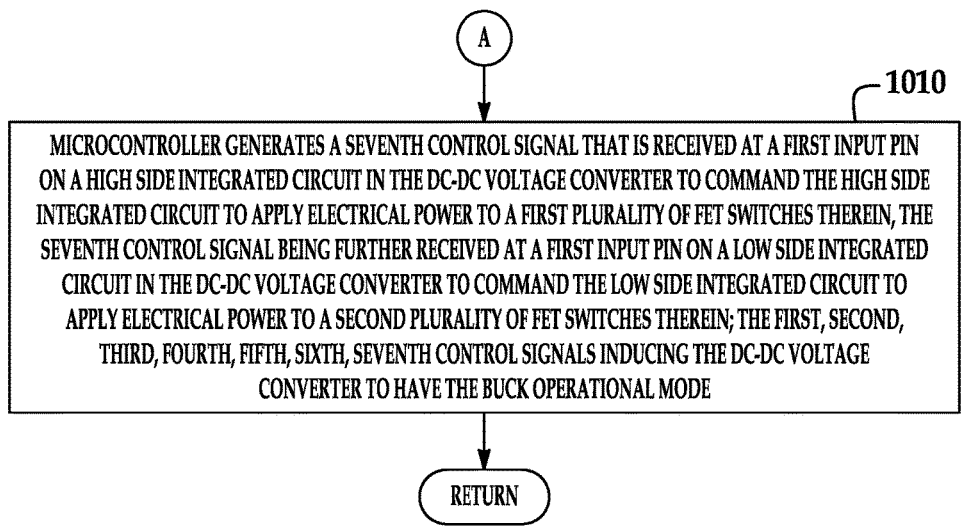

Referring to FIGS. 5 and 6, the buck application 952 will now be explained. The buck application 952 is utilized to transition the DC-DC voltage converter 54 to a buck operational mode.

At step 1000, the microcontroller 800 generates first and second control signals to induce first and second voltage drivers 802, 804, respectively, to transition the contactor 42 to a closed operational state. After step 1000, the method advances to step 1002.

At step 1002, the microcontroller 800 generates a third control signal that is received by a pre-charge high voltage bi-directional switch 202 in the DC-DC voltage converter 54 to transition the pre-charge high voltage bi-directional switch 202 to a closed operational state. After step 1002, the method advances to step 1004.

At step 1004, the microcontroller 800 generates a fourth control signal that is received by a pre-charge low voltage bi-directional switch 272 in the DC-DC voltage converter 54 to transition the pre-charge low voltage bi-directional switch 272 to the closed operational state. After step 1004, the method advances to step 1006.

At step 1006, the microcontroller 800 generates a fifth control signal that is received by a high voltage bi-directional switch 200 in the DC-DC voltage converter 54 to transition the high voltage bi-directional switch 200 to the closed operational state. After step 1006, the method advances to step 1008.

At step 1008, the microcontroller 800 generates a sixth control signal that is received by a low voltage bi-directional switch 270 in the DC-DC voltage converter 54 to transition the low voltage bi-directional switch 270 to the closed operational state. After step 1008, the method advances to step 1010.

At step 1010, the microcontroller 800 generates a seventh control signal (e.g., high logic level voltage) that is received at a first input pin 500 on a high side integrated circuit 450 in the DC-DC voltage converter 54 to command the high side integrated circuit 450 to apply electrical power to a first plurality of FET switches 506 therein. The seventh control signal is further received at a first input pin 600 on a low side integrated circuit 452 in the DC-DC voltage converter 54 to command the low side integrated circuit 452 to apply electrical power to a second plurality of FET switches 606 therein. The first, second, third, fourth, fifth, sixth and seventh control signals induce the DC-DC voltage converter 54 to have the buck operational mode. After step 1010, the method returns to the main application 950.

Figure 7:
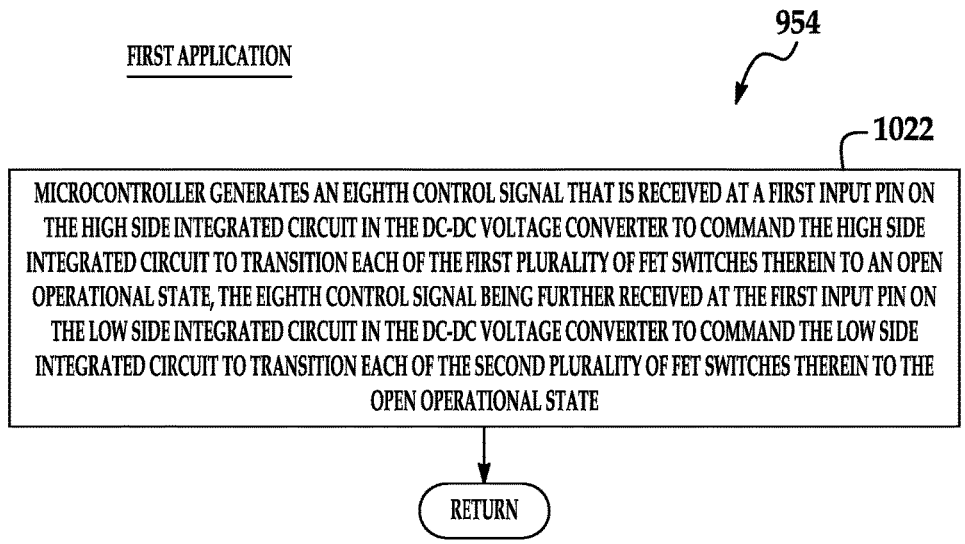

Referring to FIG. 7, the first application 954 will now be explained.

At step 1022, the microcontroller 800 generates an eighth control signal (e.g., low logic level voltage) that is received at the first input pin 500 on the high side integrated circuit 450 in the DC-DC voltage converter 54 to command the high side integrated circuit 450 to transition each of the first plurality of FET switches 506 therein to an open operational state. The eighth control signal is further received at the first input pin 600 on the low side integrated circuit 452 in the DC-DC voltage converter 54 to command the low side integrated circuit 452 to transition each of the second plurality of FET switches 606 therein to the open operational state. After step 1022, the method returns to the main application 950.

Figure 8:
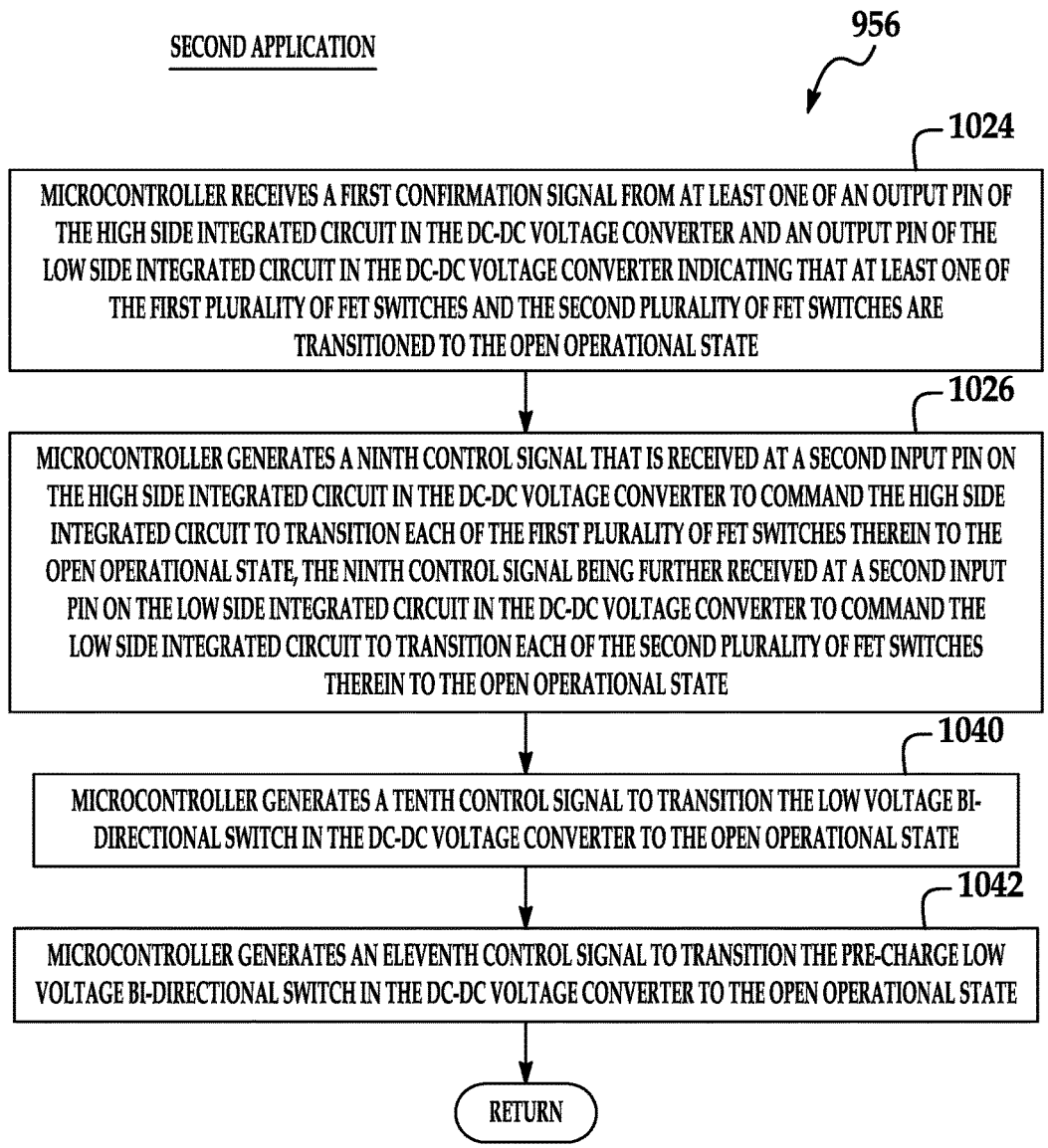

Referring to FIG. 8, the second application 956 will now be explained.

At step 1024, the microcontroller 800 receives a first confirmation signal from at least one of an output pin 504 of the high side integrated circuit 450 in the DC-DC voltage converter 54 and an output pin 604 of the low side integrated circuit 452 in the DC-DC voltage converter 54 indicating that at least one of the first plurality of FET switches 506 and the second plurality of FET switches 606 are transitioned to the open operational state. After step 1024, the method advances to step 1026.

At step 1026, the microcontroller 800 generates a ninth control signal (e.g., low logic level voltage) that is received at a second input pin 502 on the high side integrated circuit 450 in the DC-DC voltage converter 54 to command the high side integrated circuit 450 to transition each of the first plurality of FET switches 506 therein to the open operational state. The ninth control signal is further received at a second input pin 602 on the low side integrated circuit 452 in the DC-DC voltage converter 54 to command the low side integrated circuit 452 to transition each of the second plurality of FET switches 606 therein to the open operational state. After step 1026, the method advances to step 1040.

At step 1040, the microcontroller 800 generates a tenth control signal to transition the low voltage bi-directional switch 270 in the DC-DC voltage converter 54 to the open operational state. After step 1040, the method advances to step 1042.

At step 1042, the microcontroller 800 generates an eleventh control signal to transition the pre-charge low voltage bi-directional switch 272 in the DC-DC voltage converter 54 to the open operational state. After step 1042, the method returns to the main application 950.

Figure 9:
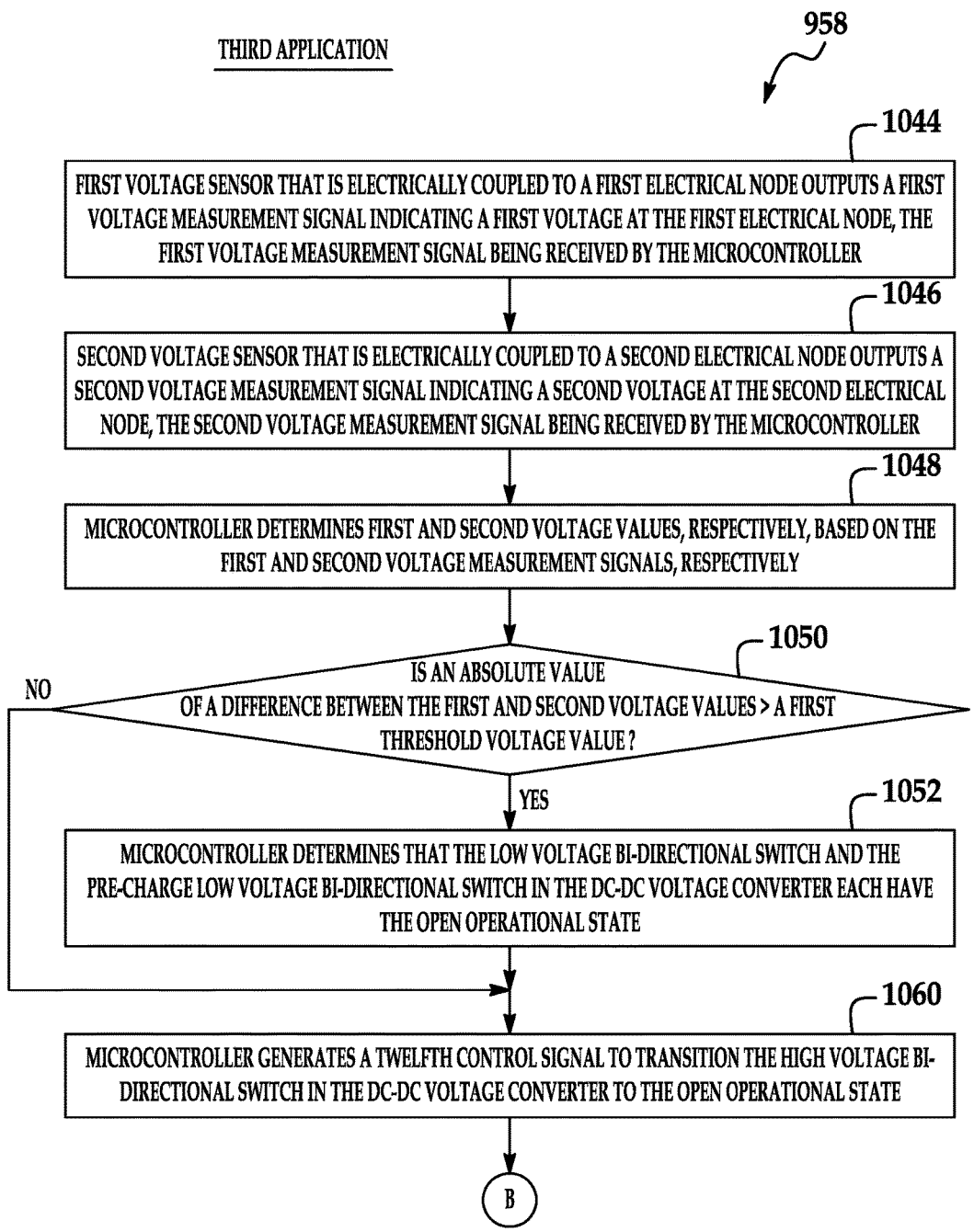
Figures 10, 11:
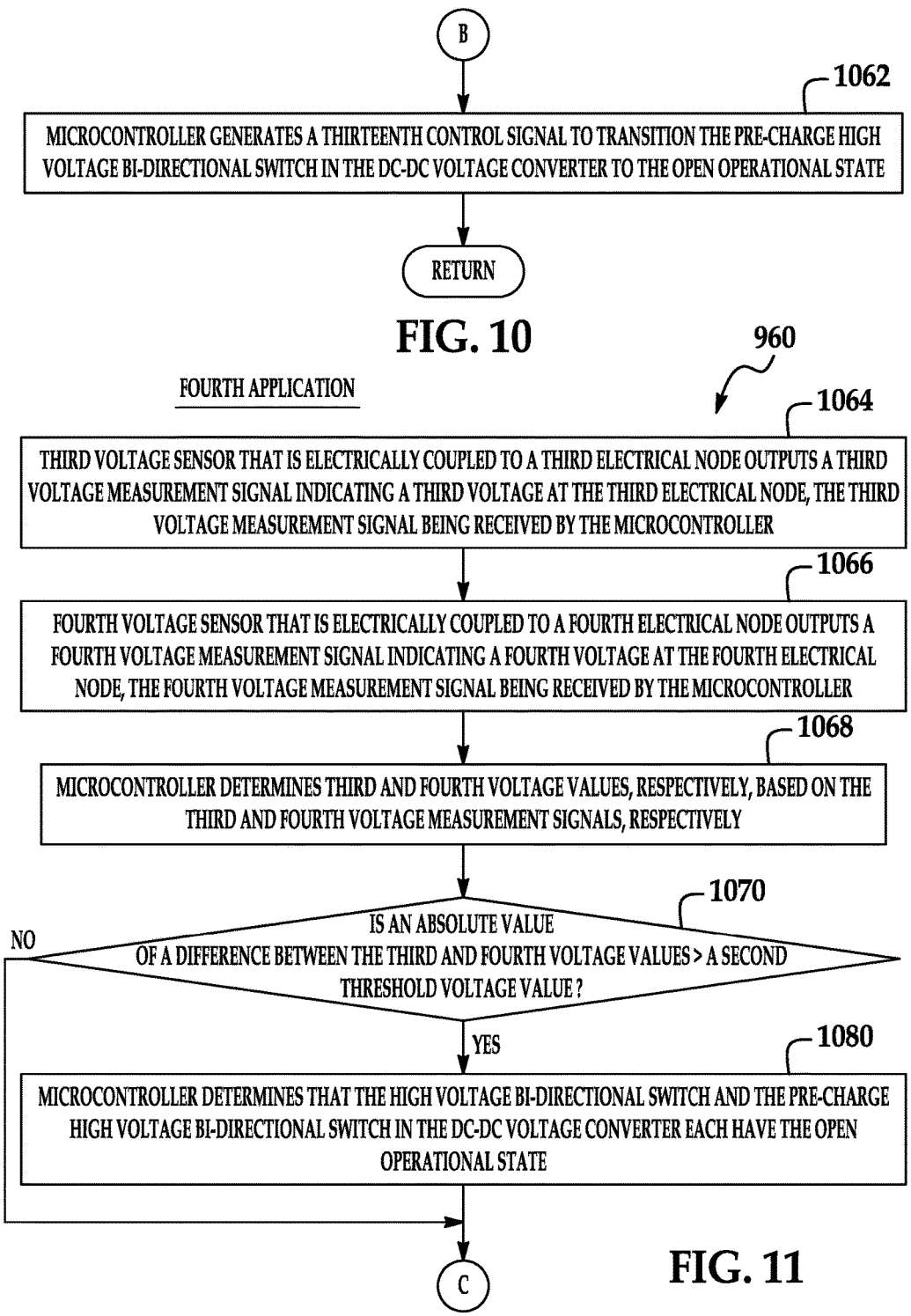

Referring to FIGS. 9 and 10, the third application 958 will now be explained.

At step 1044, the voltage sensor 294 that is electrically coupled to the electrical node 280 outputs a first voltage measurement signal indicating a first voltage at the electrical node 280. The first voltage measurement signal is received by the microcontroller 800. After step 1044, the method advances to step 1046.

At step 1046, the voltage sensor 296 that is electrically coupled to the electrical node 282 outputs a second voltage measurement signal indicating a voltage at the electrical node 282. The second voltage measurement signal is received by the microcontroller 800. After step 1046, the method advances to step 1048.

At step 1048, the microcontroller 800 determines first and second voltage values, respectively, based on the first and second voltage measurement signals, respectively. After step 1048, the method advances to step 1050.

At step 1050, the microcontroller 800 makes a determination as to whether an absolute value of a difference between the first and second voltage values is greater than a first threshold voltage value. If the value of step 1050 equals "yes", the method advances to step 1052. Otherwise, the method advances to step 1060.

At step 1052, the microcontroller 800 determines that the low voltage bi-directional switch 270 and the pre-charge low voltage bi-directional switch 272 in the DC-DC voltage converter 54 each have the open operational state. After step 1052, the method advances to step 1060.

At step 1060, the microcontroller 800 generates a twelfth control signal to transition the high voltage bi-directional switch 200 in the DC-DC voltage converter 54 to the open operational state. After step 1060, the method advances to step 1062.

At step 1062, the microcontroller 800 generates a thirteenth control signal to transition the pre-charge high voltage bi-directional switch 202 in the DC-DC voltage converter 54 to the open operational state. After step 1062, the method returns to the main application 950.

Figure 12:
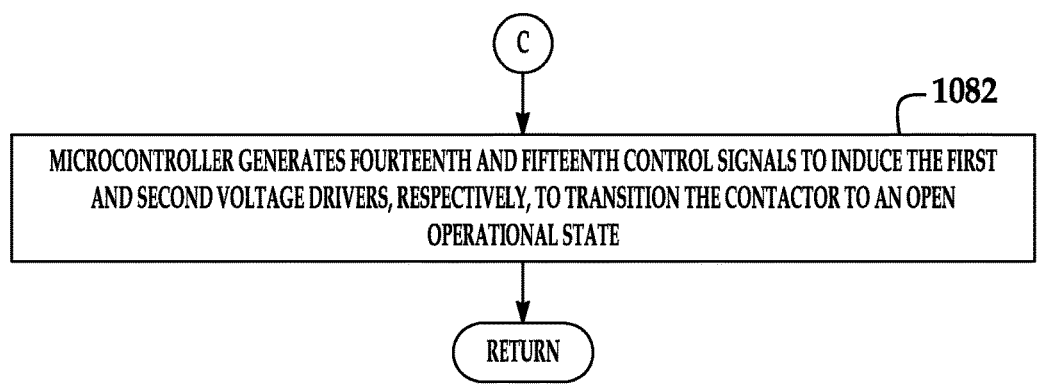

Referring to FIGS. 11 and 12, the fourth application 960 will now be explained.

At step 1064, the voltage sensor 290 that is electrically coupled to the electrical node 210 outputs a third voltage measurement signal indicating a voltage at the electrical node 210. The third voltage measurement signal is received by the microcontroller 800. After step 1064, the method advances to step 1066.

At step 1066, the voltage sensor 292 that is electrically coupled to the electrical node 212 outputs a fourth voltage measurement signal indicating a voltage at the electrical node 212. The fourth voltage measurement signal is received by the microcontroller 800. After step 1066, the method advances to step 1068.

At step 1068, the microcontroller 800 determines third and fourth voltage values, respectively, based on the third and fourth voltage measurement signals, respectively. After step 1068, the method advances to step 1070.

At step 1070, the microcontroller 800 makes a determination as to whether an absolute value of a difference between the third and fourth voltage values is greater than a second threshold voltage value. If the value of step 1070 equals "yes", the method advances to step 1080. Otherwise, the method advances to step 1082.

At step 1080, the microcontroller 800 determines that the high voltage bi-directional switch 200 and the pre-charge high voltage bi-directional switch 202 in the DC-DC voltage converter 54 each have the open operational state. After step 1080, the method advances to step 1082.

At step 1082, the microcontroller 800 generates fourteenth and fifteenth control signals to induce the first and second voltage drivers 802, 804, respectively, to transition the contactor 42 to an open operational state. The eighth, ninth, tenth, eleventh, twelfth, thirteenth, fourteenth, and fifteenth control signals transition the DC-DC voltage converter 54 to the safe operational mode. After step 1082, the method returns to the main application 950.

The control system for transitioning a DC-DC voltage converter from a buck operational mode to a safe operational mode provides a substantial advantage over other control systems. In particular, the control system has a microcontroller that utilizes two distinct and independent applications that each command the microcontroller to generate a control signal to transition FET switches within a DC-DC voltage converter control circuit within the DC-DC voltage converter to open operational states. As a result, the inventive control system can more reliably transition the DC-DC voltage converter to the safe operational mode even if one of the two applications is malfunctioning or if one of the control signals is interrupted or not acted upon by the DC-DC voltage converter.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A control system for transitioning a DC-DC voltage converter from a buck operational mode to a safe operational mode, the DC-DC voltage converter having a high voltage switch, a low voltage switch, and a DC-DC voltage converter control circuit with a high side integrated circuit and a low side integrated circuit therein, the DC-DC voltage converter control circuit being electrically coupled between the high voltage switch and the low voltage switch; the high side integrated circuit having a first plurality of FET switches therein, the low side integrated circuit having a second plurality of FET switches therein, comprising:

a microcontroller having a first application and a second application;

the first application commanding the microcontroller to generate a first control signal that is received at a first input pin on the high side integrated circuit to command the high side integrated circuit to transition each of the first plurality of FET switches therein to an open operational state, the first control signal being further received at a first input pin on the low side integrated circuit to command the low side integrated circuit to transition each of the second plurality of FET switches therein to the open operational state; and the second application commanding the microcontroller to generate a second control signal that is received at a second input pin on the high side integrated circuit to command the high side integrated circuit to transition each of the first plurality of FET switches therein to the open operational state, the second control signal being further received at a second input pin on the low side integrated circuit to command the low side integrated circuit to transition each of the second plurality of FET switches therein to the open operational state.

2. The control system of claim 1, wherein:
the second application commanding the microcontroller to generate a third control signal to transition the low voltage switch to the open operational state; and
the second application commanding the microcontroller to generate a fourth control signal to transition the pre-charge low voltage switch to the open operational state.

3. The control system of claim 1, wherein the microcontroller receiving a first confirmation signal from at least one of an output pin of the high side integrated circuit and an output pin of the low side integrated circuit, the second application determining that at least one of the first plurality of FET switches and the second plurality of FET switches are transitioned to the open operational state based on the first confirmation signal.

4. The control system of claim 1, wherein:
the DC-DC voltage converter further includes a pre-charge high voltage switch and a pre-charge low voltage switch;
the low voltage switch being electrically coupled in parallel to the pre-charge low voltage switch; and
the high voltage switch being electrically coupled in parallel to the pre-charge high voltage switch.

5. The control system of claim 2, further comprising:
a first voltage sensor electrically coupled to a first electrical node between the DC-DC voltage converter control circuit and the low voltage switch, the first voltage sensor outputting a first voltage measurement signal indicating a first voltage at the first electrical node, the first voltage measurement signal being received by the microcontroller;
a second voltage sensor electrically coupled to a second electrical node between the low voltage switch and a first battery, the second voltage sensor outputting a second voltage measurement signal indicating a second voltage at the second electrical node, the second voltage measurement signal being received by the microcontroller;
the microcontroller determining first and second voltage values, respectively, based on the first and second voltage measurement signals, respectively; and the microcontroller further having a third application which determines that the low voltage switch and a pre-charge low voltage switch have each been transitioned to the open operational state, if an absolute value of a difference between the first and second voltage values is greater than a first threshold voltage value.

6. The control system of claim 5, wherein:
the third application commanding the microcontroller to generate a fifth control signal to transition the high voltage switch to the open operational state; and
the third application commanding the microcontroller to generate a sixth control signal to transition the pre-charge high voltage switch to the open operational state.

7. The control system of claim 6, further comprising:
a third voltage sensor electrically coupled to a third electrical node between a second battery and the high voltage switch, the third voltage sensor outputting a third voltage measurement signal indicating a third voltage at the third electrical node, the third voltage measurement signal being received by the microcontroller; and
a fourth voltage sensor electrically coupled to a fourth electrical node between the high voltage switch and the DC-DC voltage converter control circuit, the fourth voltage sensor outputting a fourth voltage measurement signal indicating a fourth voltage at the fourth electrical node, the fourth voltage measurement signal being received by the microcontroller;
the microcontroller determining third and fourth voltage values, respectively, based on the third and fourth voltage measurement signals, respectively; and
the microcontroller having a fourth application which determines that the high voltage switch and a pre-charge high voltage switch have each been transitioned to the open operational state, if an absolute value of a difference between the third and fourth voltage values is greater than a second threshold voltage value.

* * * * *